3,062,757
RIGID CELLULAR PLASTIC PRODUCTS AND A PROCESS FOR PRODUCING SAME

Bernard Dombrow, Teaneck, and Alvin Lerner, Newark, N.J., assignors, by mesne assignments, to the United States of America as represented by the United States Atomic Energy Commission
No Drawing. Filed Sept. 8, 1958, Ser. No. 759,428
16 Claims. (Cl. 260—2.5)

This invention relates, in general, to rigid cellular plastic products and to a process for producing same. The invention relates further to polyurethane plastics and, particularly, to those in the higher density range, which are characterized by their uniform density gradient and their uniform cell structure. More particularly, the invention relates to the novel alkyd resins which are employed in the formulation of such cellular products.

It is well known that cellular plastic products of the polyurethane type are prepared by the reaction of an alkyd resin, water and a polyisocyanate. Two reactions take place simultaneously when these reactants are mixed. In one, the polyisocyanate combines with the hydroxyl groups in the resins and with water to form macro molecules. In the other, the polyisocyanate compound and water react, liberating carbon dioxide gas. As the reaction mass polymerizes, the liberated carbon dioxide gas is entrapped in the mass expanding same and producing the cellular structure which is distinctive of polyurethane foams.

In an effort to obtain cellular plastic products having particular cell characteristics, it has been the practice to incorporate certain additives into the polyurethane reaction system. Thus, for example, foam stabilizers have been utilized to obtain cellular products, the cells of which are uniform, both in size and in shape. In general, the additives employed in producing the products of the prior art have provided a convenient means for attaining some uniformity in cell structure. However, uniformity in cell structure is only part of the problem. Variations in density throughout a cellular mass should be kept at a minimum. A completely satisfactory solution to this problem has yet to be provided.

It is the object of this invention to provide rigid cellular products of uniform cell structure and uniform foam density.

It is a further object of the invention to provide rigid cellular products, especially those having densities within the range of 20 to 60 pounds per cubic foot, which are characterized especially by the uniformity in size and the shape of the cells comprising same.

It is a more particular object of the invention to provide rigid cellular products, especially those in the higher density ranges, which are characterized in that they have substantially uniform density throughout the foamed mass.

Other objects of the invention will be obvious and will in part appear hereinafter.

We have discovered that when a partial prepolymer, the nature of which will be described in full hereinafter, is reacted with an alkyd resin produced by the reaction of a polybasic acid, or a mixture of such acids, and a blend comprising (1) a triol and (2) neopentyl glycol, a cellular plastic product of substantially uniform density and cell structure is obtained. As used herein, the expression neopentyl glycol denotes a compound having the formula $HOCH_2C(CH_3)_2CH_2OH$.

In the practice of the present invention, a partial prepolymer is first prepared. A prepolymer is a product produced by reacting an alkyd resin with an excess of polyisocyanate in the substantial absence of water. A cellular product can be obtained from such a product by reacting it either with water and an activator or by reacting it with water and an alkyd resin. A prepolymer which is to be reacted with water and a resin is commonly referred to as a "partial prepolymer," to distinguish it from a prepolymer which is to be reacted with water in the presence of an activator. However, structurally, a prepolymer and a partial prepolymer may be identical. In this specification and in the claims, it should be understood that the expression partial prepolymer is used in this sense. Specifically, the expression "partial prepolymer," where it appears in the present specification and in the claims, should be understood as denoting a product produced by reacting from about 65.0 parts to 80.0 parts by weight of polyisocyanate with from about 35.0 parts to about 20.0 parts by weight of an alkyd resin. For convenience, this partial prepolymer will be referred to at various places throughout this specification as component I.

The alkyd resins which are used in producing component I, that is, the partial prepolymer, are those prepared by reacting one or more polyhydric alcohols with a mixture comprising a dibasic acid, or a mixture of dibasic acids, and a dimerized unsaturated fatty acid. Resins of the type employed in the preparation of component I are fully described in U.S. Patent 2,802,795 to Simon et al. The polyhydric alcohols which are used in producing the desired alkyd resins are triols, such as, trimethylol propane and trimethylol ethane. These may be used alone or they may be used in admixture with each other. Furthermore, these triols may be blended with other similar triols or mixed with alcohols having a functionality greater than three per molecule, such as pentaerythritol, sorbitol, mannitol, etc. The dibasic acids which are used in the production of the resin employed in preparing the partial prepolymer include, among others, dicarboxylic acids such as oxalic acid, adipic acid, sebacic acid, phthalic anhydride, azelaic acid, itaconic acid, succinic acid, terephthalic acid, isophthalic acid, maleic anhydride, etc. The dimerized unsaturated fatty acids which are used in combination with the dibasic acids, enumerated above, in the preparation of the alkyd resin are those produced from the octadecadienoic acids. Preferably, dimerized linoleic acid, or as it is sometimes called dilinoleic acid, is used in producing the resin.

The alkyd resins which are used in preparing component I are produced using such quantities of polyhydric alcohol and dibasic acid as to provide the reaction system with a ratio of from about 1.5 to about 3.5 hydroxyl groups for each carboxyl group. The alkyd resins which are used in preparing the partial prepolymers preferably employed are prepared from a reaction mixture which contains such quantities of polyhydric alcohol and dibasic acid as to provide from about 2 to about 3 hydroxyl groups for each carboxyl group. Typical formulas for alkyd resins which can be used in producing component I are as follows:

RESIN A (ACID NUMBER 20 TO 40)

| | Mols |
|---|---|
| Trimethylol propane | 4.0 |
| Phthalic anhydride | 2.5 |
| "Dimer acid" | 0.5 |

RESIN B (ACID NUMBER 20 TO 40)

| | |
|---|---|
| Trimethylol propane | 4.0 |
| Adipic acid | 2.0 |
| Phthalic anhydride | 0.5 |
| "Dimer acid" | 0.5 |

RESIN C (ACID NUMBER 15 TO 40)

| | Mols |
|---|---|
| Trimethylol ethane | 4.0 |
| Adipic acid | 1.0 |
| Phthalic anhydride | 0.5 |
| "Dimer acid" | 0.5 |

RESIN D (ACID NUMBER 10 TO 40)

| | |
|---|---|
| Trimethylol propane, trimethylol ethane or mixtures thereof | 4.0 |
| Succinic acid | 1.0 |
| Phthalic anhydride | 0.5 |
| "Dimer acid" | 0.5 |

RESIN E (ACID NUMBER 5 TO 40)

| | |
|---|---|
| Trimethylol propane | 4.0 |
| Adipic acid | 2.0 |
| "Dimer acid" | 0.05 |

These resins, when adjusted to an acid number of from about 5 to about 100, preferably, to an acid number of from about 10 to 75, and to a water content of less than about 0.1% by weight, based on the weight of the resin, are very well suited for use in the preparation of component I.

The partial prepolymers which are used in the practice of this invention are prepared, preferably, by the reaction of the alkyd resin with meta-toluene diisocyanate. However, partial prepolymers products from poly-functional organic isocyanates other than meta-toluene diisocyanate can be employed also. Thus, for example, partial prepolymers prepared by reacting the resin with polyfunctional isocyanate compounds, such as, trimethylene diisocyanate, tetramethylene diisocyanate, pentamethylene diisocyanate, hexamethylene diisocyanate, toluene-2,4-diisocyanate, toluene-2,6-diisocyanate, m-phenylene diisocyanate, p-phenylene diisocyanate, triphenyl diisocyanate, ethylene diisocyanate, propylene-1,2-diisocyanate, diphenylmethane diisocyanate, triphenylmethane diisocyanate, etc. and mixtures thereof, are very well suited for use.

The high density rigid cellular plastic products of this invention are obtained by reacting component I, the partial prepolymer, with an alkyd resin which, for convenience, will be referred to herein as component II. This resin is formulated, for the most part, in the same manner as are most alkyd resins of the prior art. It differs from the conventional resins of the art, however, in that, in addition to a triol, neopentyl glycol is used in its formulation. It has been found that when an alkyd resin, which, in its preparation, has been modified by the use of neopentyl glycol, is reacted with a partial prepolymer of the type heretofore described, a foamed plastic product having both uniform cell structure and foam density is obtained. While the invention is not limited to higher density products, that is, cellular products in the density range of 20 to 60 pounds per cubic foot, it is particularly significant in that it provides a convenient means for obtaining uniform density and cell structure in such products. In general, any of the dibasic acids which are normally employed in the production of an alkyd resin, can be used in producing the modified resin employed herein. Fully suited for use are dibasic acids which are dicarboxylic acids such as oxalic acid, adipic acid, sebacic acid, phthalic anhydride, azelaic acid, itaconic acid, succinic acid, terephthalic acid, isophthalic acid, maleic anhydride, etc. Furthermore, dimerized unsaturated fatty acids of the type used in preparing the alkyd resin employed in preparing component I can be employed in admixture with the dibasic acid reactant in the formulation of this resin. Moreover, trimethylol propane, trimethylol ethane, etc. can be used as the triol component of our neopentyl glycol-modified resin formulation. Either trimethylol propane or trimethylol ethane can be used as the sole triol component of the reaction mixture or a mixture thereof can be employed. A mixture of one or the other or both of these with other similar triols can also be used. In addition, mixtures of a triol or triols with polyhydric alcohols having a functionality which is greater than three per molecule can also be used in the formulation of our neopentyl glycol-modified alkyd resins. Such polyhydric alcohols include, for example, pentaerythritol, sorbitol, mannitol, etc.

Component II, the neopentyl glycol-modified alkyd resin, is prepared by reacting such quantities of polyols, including neopentyl glycol, triols, and polyhydric alcohols having a functionality which is greater than three per molecule, and dibasic acid to provide a ratio of hydroxyl and carboxyl groups in the reaction mixture which is within the range of from 1.5 to about 3.5 hydroxyl groups for each carboxyl group. Preferably, however, the reaction mixture will contain such quantities of reactants as to provide therein a ratio of hydroxyl groups to carboxyl groups which is within the range of from about 1.5 to about 2.5 hydroxyls for each carboxyl group. Such resins, when adjusted to an acid value within the range of from about 5 to about 50, preferably to an acid value from about 10 to about 25, and to a water content which is not in excess of about 7.0% by weight, for example, from about 0.04% to about 7.0% by weight, based on the weight of the resin, are well suited for use in the production of component II. Obviously, however, in preparing products in the higher density ranges, the amount of water present in the reaction system will be considerably less than the maximum amount indicated heretofore.

Although the use of neopentyl glycol in the formulation of component II is the means by which we have been able to obtain both uniform foam density and uniform cell structure, only a relatively small quantity of neopentyl glycol need be used. Thus, for example, in a typical formulation, only about 0.3 mol of neopentyl glycol is used for each mol of triol present in the formulation. A lower ratio of neopentyl glycol to triol could be used, if desired, as, for example, a ratio of about 0.2 mol of neopentyl glycol for each mol of triol. A higher ratio, as, for example, a ratio of up to about 1.8 mols of glycol for each mol of triol could also be employed. However, cellular products having the most satisfactory properties have been obtained when component II is the product produced from a reaction mixture which contains about 0.3 mol of neopentyl glycol for each mol of triol present therein.

The procedure by which the reaction of component I with component II is carried out will be obvious to anyone skilled in the art. The two components are first pre-mixed in some suitable vessel. When homogeneous, but before the exothermic reaction fully commences, that is, before the mixture begins to foam appreciably, the mixture is poured in place and allowed to react to atmospheric pressure. The premixing and pouring can be accomplished either at room temperature or at a temperature which is elevated somewhat above room temperature, as, for example, at a temperature of from about 120° F. to about 125° F. The components are allowed to react and the reaction is permitted to proceed to completion. A rigid foamed cellular plastic product will be obtained. Postcuring of the cellular product at elevated temperatures is desirable in most cases and, in all instances, it is preferable.

The amounts of component I and component II which are reacted to give the desired product will vary. A sufficient quantity of component I will be present in the system to react completely with component II. The quantity of component I needed to react with component II can be calculated quite readily from the amine equivalent of component I and the hydroxyl number, acid value and water content of component II. Under ordinary circumstances, however, an excess of component I, for example, up to about 15% in excess of theoretical, may be employed.

Many advantages flow from the practice of this invention. First and foremost, the invention provides a means whereby one can obtain cellular plastic products of substantially uniform foam density. Moreover, the cells comprising such products are substantially uniform both in size and in shape. The invention will be found to be particularly advantageous in the production of products in the higher density ranges although it is not restricted to such products. Moreover, the cellular products of this invention have been found to undergo far less deformation, when subjected to a constant weight load at an elevated temperature, than anticipated. Normally, the use of a diol modified resin in the formulation of a rigid foam will greatly increase the tendency of the foam to deform when subjected to such conditions. However, the invention is noteworthy for other reasons also. Our invention is such that the products thereof can be prepared utilizing the techniques and equipment which are presently employed commercially. This is due, in part, to the fact that, in their physical properties and characteristics, component I, the partial prepolymer, and component II, the neopentyl glycol-modified resin, are well suited for machine handling. At temperatures of about 100° F., the components are quite fluid and they blend easily. Finally, the components can be stored for future use since both are quite stable.

For a fuller understanding of the nature and objects of the invention, reference may be had to the following example which is given merely as a further illustration of the invention and is not to be construed in a limiting sense. All parts given in the example are parts by weight unless otherwise indicated.

*Example I*

In this example, a partial prepolymer was first prepared by reacting an alkyd resin with Hylene TM (an organic polyisocyanate which is 80% toluene-2,4-diisocyanate and 20% toluene-2,6-diisocyanate, manufactured by E. I. du Pont de Nemours & Co., Wilmington, Delaware), at a temperature of about 65° C. The alkyd resin used was the reaction product of 4.0 mols of trimethylol propane, 2.0 mols of adipic acids, 0.5 mol of phthalic anhydride and 0.5 mol of dimerized linoleic acid. This resin had an acid value of 20, a hydroxyl value of 329 and a water content of less than about 0.07% by weight. The partial prepolymer reaction mixture was comprised of 24.5 parts by weight of the aforementioned resin and 75.5 parts by weight of Hylene TM. The partial prepolymer thus produced had an amine equivalent of 140 and a viscosity, as measured on a Brookfield viscometer using spindle No. 3 at 12 r.p.m., of about 2,600 centipoises at a temperature of 25° C.

The partial prepolymer was divided into five separate portions. Each portion was reacted with the same alkyd resin. In the first instance, however, the water content of the resin had been adjusted to about 0.6% by weight. In the second, the water content of the resin had been adjusted to about 0.4% by weight. In the third, fourth and fifth instances, the resins employed had been adjusted to 0.25% by weight, 0.08% by weight and 0.04% by weight, respectively. Except for the water content thereof, the alkyd resin used in each case was the same. The resin was the reaction product of 2.0 mols of adipic acid, 0.5 mol of isophthalic acid, 0.5 mol of dimerized linoleic acid, 1.0 mol of neopentyl glycol and 3.2 mols of trimethylol propane. This resin had a hydroxyl value of 304, an acid value of 20 and a viscosity, as determined on a Brookfield viscometer using spindle No. 3 at 12 r.p.m., of about 245,000 centipoises at 25° C. The reaction mixture which contained the resin with water content of 0.6% by weight was comprised of 51.0% by weight of resin and 49.0% of partial prepolymer. The reaction mixture which contained the resin with water content of 0.4% by weight was comprised of 52.0% by weight of resin and 48.0% by weight of partial prepolymer. The reaction mixture which contained the resin with water content of 0.25% by weight was also comprised of 52.0% by weight of resin and 48.0% by weight of partial prepolymer. The reaction mixture which contained the resin with water content of 0.08% by weight was comprised of 54.0% by weight of resin and 46.0% by weight of partial prepolymer. The reaction mixture which contained the resin with water content of 0.04% by weight was comprised also of 54.0% by weight of resin and 46.0% by weight of prepolymer.

The manner in which the partial prepolymer and the alkyd resin were reacted was the same in each case. The two components were first heated separately to a temperature of about 100° F. The resin was then charged into the partial prepolymer. The reactants blended easily with stirring. The reactants were mixed until the temperature of the reaction mixture rose to about 120° F. At this stage, the pre-mix in each instance was milky and in a semi-gel state but it was still reasonably fluid and could be poured in place readily and rapidly. The reaction mixtures at this stage were poured into individual molds measuring one cubic foot. Each pour was allowed to cool down slowly after having been cured in an oven at a temperature of about 200° F. for two hours.

The cellular products thus obtained had the following characteristics. From the resins having water contents of 0.6%, 0.4%, 0.23%, 0.08%, and 0.04%, cellular products were obtained having densities of 20, 30, 40, 50 and 60 pounds per cubic foot, respectively. To the naked eye, the cells comprising these products were substantially uniform in size and shape. The interiors, or the cores, of the foamed products were neither discolored nor charred. This was an indication that the masses had relatively moderate exotherm. By this we mean that relatively moderate temperatures were developed in or about the center of the foaming reaction mass.

The products which had densities of 20, 40 and 60 pounds per cubic foot were then sampled and the uniformity of the foam density of the three samples was determined systematically. Each product sampled had the dimensions 36 inches x 8 inches x 6 inches. The average density of the sampled 20 pound per cubic foot foam was found to be 17.8 pounds per cubic foot. The average density of the sampled 40 pound per cubic foot foam was found to be 38.2 pounds per cubic foot. The average density of the sampled 60 pound per cubic foot foam was found to be 59.6 pounds per cubic foot. The difference between the density of the foam, as originally poured, and the average density of the sampled foam is attributable to the method of sampling. Each pour contains a dense outer or skin portion. In sampling the original pour, the outer surface or the skin was trimmed off the block to a depth of 0.5 inch. The removal of the high density skin portion results in a lower over-all density for the core of the sampled block which remains. However, as the density of the pour is increased, the difference between the density of the block before sampling and the density of the block, as sampled, decreases.

For comparative purposes, the procedure described herein for producing foamed products of 20 pounds per cubic foot density was repeated in every detail, employing, however, as component II, first a resin prepared by substituting diethylene glycol for neopentyl glycol and secondly a resin prepared by substituting 1,3-butylene glycol for neopentyl glycol. For further comparison, the entire procedure was repeated employing, however, as component II an alkyd resin which was not modified in its production by the use of a diol.

Thereafter, a determination was made of the percentage of cubic inch samples in each of the 20 pound per cubic foot density blocks which were within the narrow plus and minus 2.5% of the average density. The table below summarizes the results of these uniformity studies. In the table, the products prepared using as component II, the diethylene glycol-modified resin, the 1,3-butylene glycol modified resin and the neopentyl glycol-modified resin are designated as A, B and C, respectively. The product prepared using, as component II, the resin which was not modified by means of a diol is desginated as D.

| Product | Pour Density, lbs./cu. ft. | Average Density, lbs./cu. ft. | Cubic Inch Samples Within 2.5% of Average Density, Percent |
| --- | --- | --- | --- |
| A | 20 | 17.2 | 60 |
| B | 20 | 17.3 | 40 |
| C | 20 | 17.8 | 78 |
| D | 20 | 17.6 | 64 |

The above results indicated that, whereas the use of a diethylene glycol-modified alkyd resin and the use of 1,3-butylene glycol resin decreased the uniformity of the density of foams prepared therefrom, the use of the neopentyl glycol-modified resin substantially improved the uniformity of the density of the product.

To demonstrate that the use of a neopentyl glycol-modified resin produced a more uniform density gradient in the products of higher density range, the uniformity determination described heretofore was repeated, using the 40 and 60 pounds per cubic foot density products. The results of these determinations were as follows:

| Pour Density, lbs./cu. ft. | Average Density, lbs./cu. ft. | Cubic Inch Samples Within 2.5% of Average Density, Percent |
| --- | --- | --- |
| 40 | 38.2 | 78 |
| 60 | 59.6 | 88 |

In addition to the uniformity studies conducted in connection with the products of this example, the extent to which our products were deformed when subjected to a constant weight load at an elevated temperature was also ascertained. This test was deemed to be important since, as indicated heretofore, ordinarily, the use of a diol modified alkyl resin in the production of a rigid foam will materially increase the tendency of the cellular product to deform. The determination was carried out on the 20, 30, 40 and 60 pounds per cubic foot foams. The test embodied the application of a weight load of 60 pounds per square inch at a temperature of 70° C. to a block of each product measuring ½ inch x ½ inch x ½ inch. The 20 pound per cubic foot density product was deformed only to the extent of 1.1% in 24 hours and 1.4% in 72 hours. The 30 pound per cubic foot density product was deformed only to the extent of 0.7% in 24 hours and 0.8% in 72 hours. The 40 pound per cubic foot density product was deformed only to the extent of 0.8% in 24 hours and 0.9% in 72 hours. The 60 pound per cubic foot density product was deformed only to the extent of 1.5% in 24 hours and 1.9% in 72 hours.

Having described our invention what we claim as new and desire to secure by Letters Patent is:

1. A rigid urethane foam, said foam having a density between about 20 to 60 pounds per cubic foot, and being further characterized by having throughout a substantially uniform cell structure and a substantially uniform density comprising the reaction product of a partial prepolymer with an alkyd resin having an acid value of from 5.0 to 50.0 and water present in an amount up to about 7.0%, said alkyd resin being the product obtained by reacting a mixture comprising (1) a triol selected from the group consisting of trimethylol propane and trimethylol ethane, (2) neopentyl glycol, and (3) a dicarboxylic acid in such quantities as to provide the reaction mixture with a ratio of from about 1.5 to about 3.5 hydroxyl groups for each carboxyl group, the ratio of neopentyl glycol in the formulation being between about 0.2 mol to 1.8 mols thereof for each 1.0 mol of said triol, the partial prepolymer employed being the reaction product of from about 65 to about 80.0 parts by weight of an organic polyisocyanate and from about 35 to about 20.0 parts by weight of an alkyd resin, having an acid number of from 5 to 100 and a ratio of hydroxyl groups to carboxyl groups of from 1.5:1 to 3.5:1, respectively, prepared by reacting a mixture comprising a dicarboxylic acid and a triol selected from the group consisting of trimethylol propane and trimethylol ethane.

2. A rigid urethane foam, said foam having a density between about 20 to 60 pounds per cubic foot, and being further characterized by having throughout a substantially uniform cell structure and a substantially uniform density comprising the reaction product of a partial prepolymer with an alkyd resin having an acid value of from 10.0 to 25.0 and a water content of from about 0.04% to about 7.0%, said alkyd resin being the product obtained by reacting a mixture comprising (1) a triol selected from the group consisting of trimethylol propane and trimethylol ethane, (2) neopentyl glycol, and (3) a dicarboxylic acid in such quantities as to provide the reaction mixture with a ratio of from about 1.5 to about 3.5 hydroxyl groups for each carboxyl group, the ratio of neopentyl glycol in the formulation being between about 0.2 mol to 1.8 mols thereof for each 1.0 mol of said triol, the partial prepolymer employed being the reaction product of from about 65 to about 80.0 parts by weight of meta-toluene diisocyanate and from about 35 to about 20.0 parts by weight of an alkyd resin, having an acid number of from 10 to 75 and a ratio of hydroxyl groups to carboxyl groups of 1.5:1 to 3.5:1 respectively, prepared by reacting a mixture comprising a dicarboxylic acid and a triol selected from the group consisting of trimethylol propane and trimethylol ethane.

3. A rigid urethane foam, said foam having a density between about 20 to 60 pounds per cubic foot, and being further characterized by having throughout a substantially uniform cell structure and a substantially uniform density comprising the reaction product of a partial prepolymer with an alkyd resin having an acid value of from 10.0 to 25.0 and a water content of from about 0.04% to about 7.0%, said alkyd resin being the product obtained by reacting a mixture comprising (1) trimethylol propane, (2) neopentyl glycol, and (3) a dicarboxylic acid in such quantities as to provide the reaction mixture with a ratio of from about 1.5 to about 3.5 hydroxyl groups for each carboxyl group, the ratio of neopentyl glycol in the formulation being between about 0.2 mol to 1.8 mols thereof for each 1.0 mol of said triol, the partial prepolymer employed being the reaction product of from about 65.0 to about 80.0 parts by weight of meta-toluene diisocyanate and from about 35 to about 20.0 parts by weight of an alkyd resin having an acid number of from 10 to 75 and a ratio of hydroxyl groups to carboxyl groups of 1.5:1 to 3.5:1 respectively, prepared by reacting a mixture comprising a dicarboxylic acid and a triol selected from the group consisting of trimethylol propane and trimethylol ethane.

4. A rigid urethane foam, said foam having a density between about 20 to 60 pounds per cubic foot, and being further characterized by having throughout a substantially uniform cell structure and a substantially uniform density comprising the reaction product of a partial prepolymer with an alkyd resin having an acid value of from 10 to 25 and a water content of from about 0.04% to about 7.0%, said alkyd resin being the product obtained by reacting a mixture comprising (1) trimethylol ethane, (2) neopentyl glycol, and (3) a dicarboxylic acid in such quantities as to provide the reaction mixture with a ratio of from about 1.5 to about 3.5 hydroxyl groups for each carboxyl group, the ratio of neopentyl glycol in the formulation being between about 0.2 mol to 1.8 mols thereof for each 1.0 mol of said triol, the partial prepolymer employed being the reaction product of from about 65 to about 80.0 parts by weight of meta-toluene diisocyanate and from about 35 to about 20.0 parts by weight of an alkyd resin having an acid number of from 10 to 75 and a ratio of hydroxyl groups to carboxyl groups of 1.5:1 to 3.5:1, respectively, prepared by reacting a mixture comprising a dicarboxylic acid and a triol selected from the group consisting of trimethylol propane and trimethylol ethane.

5. The product of claim 3 wherein the dicarboxylic acid in the neopentyl glycol modified resin formulation is adipic acid.

6. The product of claim 3 wherein the dicarboxylic acid in the neopentyl glycol modified resin formulation is a mixture of adipic acid and isophthalic acid.

7. The product of claim 4 wherein the dicarboxylic acid in the neopentyl glycol modified resin formulation is adipic acid.

8. The product of claim 4 wherein the dicarboxylic acid in the neopentyl glycol modified resin formulation is a mixture of adipic acid and isophthalic acid.

9. A rigid urethane foam, said foam having a density between about 20 to 60 pounds per cubic foot, and being further characterized by having throughout a substantially uniform cell structure and a substantially uniform density comprising the reaction product of a partial prepolymer with an alkyd resin having an acid value of from 10 to 25 and a water content of from about 0.04% to about 7.0%, said alkyd resin being the product obtained by reacting a mixture comprising (1) a triol selected from the group consisting of trimethylol propane and trimethylol ethane, (2) neopentyl glycol, and (3) a dicarboxylic acid in such quantities as to provide the reaction mixture with a ratio of from about 1.5 to about 2.5 hydroxyl groups for each carboxyl group, the ratio of neopentyl glycol in the formulation being about 0.3 mol for each 1.0 mol of said triol, the partial prepolymer employed being the reaction product of from about 65.0 to about 80.0 parts by weight of meta-toluene diisocyanate and from about 35.0 to about 20.0 parts by weight of an alkyd resin having an acid number of from 10 to 75 and a ratio of hydroxyl groups to carboxyl groups of 1.5:1 to 3.5:1, respectively, prepared by reacting a mixture comprising a dicarboxylic acid, dilinoleic acid and a triol selected from the group consisting of trimethylol propane and trimethylol ethane.

10. The product of claim 9 wherein the triol is trimethylol propane.

11. The product of claim 9 wherein the triol is trimethylol ethane.

12. A rigid urethane foam, said foam having a density between about 20 to 60 pounds per cubic foot, and being further characterized by having throughout a substantially uniform cell structure and a substantially uniform density comprising the reaction product of a partial prepolymer with an alkyd resin having an acid value of from 10 to 25 and a water content of from about 0.04% to about 7.0%, said alkyd resin being the product obtained by reacting 2.0 mols of adipic acid, 0.5 mol of isophthalic acid, 0.5 mol of dilinoleic acid, 3.2 mols of trimethylol propane and 1.0 mol of neopentyl glycol, the partial prepolymer employed being the reaction product of from about 65.0 to about 80.0 parts by weight of meta-toluene diisocyanate and from about 35.0 to about 20.0 parts by weight of an alkyd resin having an acid number of from 5 to 100 prepared by reacting 4.0 mols of trimethylol propane, 2.0 mols of adipic acid, 0.5 mol of phthalic anhydride and 0.5 mol of dilinoleic acid.

13. A process for preparing rigid urethane foams characterized by a uniform density gradient and a uniform cell structure and having a density between about 20 to 60 pounds per cubic foot which comprises blending together a partial prepolymer and an alkyd resin whereupon the resulting reaction mixture reacts and foams thereby forming rigid urethane foam, said alkyd resin having an acid value of from 5.0 to 50.0 and water present in an amount up to about 7.0% and being the product obtained by reacting a mixture comprising (1) a triol selected from the group consisting of trimethylol propane and trimethylol ethane, (2) neopentyl glycol, and (3) a dicarboxylic acid in such quantities as to provide the reaction mixture with a ratio of from about 1.5 to about 3.5 hydroxyl groups for each carboxyl group, the ratio of neopentyl glycol in the formulation being about 0.2 mol to 1.8 mols thereof for each 1.0 mol of said triol, the partial prepolymer employed being the reaction product of from about 65.0 to about 80.0 parts by weight of an organic polyisocyanate and from about 35.0 to about 20.0 parts by weight of an alkyd resin having an acid number of from 5 to 100 and a ratio of hydroxyl to carboxyl groups of from 1.5:1 to 3.5:1, respectively, prepared by reacting a mixture comprising a dicarboxylic acid and a triol selected from the group consisting of trimethylol propane and trimethylol ethane.

14. A process for preparing rigid urethane foams characterized by a uniform density gradient and a uniform cell structure and having a density between about 20 to 60 pounds per cubic foot which comprises blending together a partial prepolymer and an alkyd resin whereupon the resulting reaction mixture reacts and foams thereby forming rigid urethane foam, said alkyd resin having an acid value of from 10.0 to 25.0 and a water content of from about 0.04% to about 7.0% and being the product obtained by reacting a mixture comprising (1) a triol selected from the group consisting of trimethylol propane and trimethylol ethane, (2) neopentyl glycol, and (3) a dicarboxylic acid in such quantities as to provide the reaction mixture with a ratio of from about 1.5 to about 3.5 hydroxyl groups for each carboxyl group, the ratio of neopentyl glycol in the formulation being between about 0.2 mol to 1.8 mols thereof for each 1.0 mol of said triol, the partial prepolymer employed being the reaction product of from about 65.0 to about 80.0 parts by weight of meta-toluene diisocyanate and from about 35.0 to about 20.0 parts by weight of an alkyd resin having an acid number of from 10 to 75 and a ratio of hydroxyl groups to carboxyl groups of 1.5:1 to 3.5:1 respectively, prepared by reacting a mixture comprising a dicarboxylic acid and a triol selected from the group consisting of trimethylol propane and trimethylol ethane.

15. The process of claim 14 in which said triol in the neopentyl glycol modified resin formulation is trimethylol propane.

16. The process of claim 14 in which said triol in the neopentyl glycol modified resin formulation is trimethylol ethane.

References Cited in the file of this patent

UNITED STATES PATENTS

| | | |
|---|---|---|
| 2,764,565 | Hoppe et al. | Sept. 25, 1956 |
| 2,779,689 | Reis | Jan. 29, 1957 |
| 2,806,836 | Nischk et al. | Sept. 17, 1957 |
| 2,820,023 | Cavanaugh et al. | Jan. 14, 1958 |
| 2,855,021 | Hoppe | Oct. 7, 1958 |